UNITED STATES PATENT OFFICE.

RICHARD J. McGOWAN, OF NEW YORK, N. Y., ASSIGNOR TO THE EGYPTIAN EMBALMER COMPANY, OF SAME PLACE.

IMPROVEMENT IN EMBALMING COMPOSITIONS.

Specification forming part of Letters Patent No. 206,343, dated July 23, 1878; application filed June 19, 1878.

*To all whom it may concern:*

Be it known that I, RICHARD J. MCGOWAN, of the city, county, and State of New York, have invented a new and Improved Embalming Composition, of which the following is a specification:

The object of this invention is to furnish for undertakers an improved embalming composition that has a strong affinity for animal tissues, so as to permeate them and subject them to its preserving and antiseptic influence without the use of ice.

The invention consists of a solution of thymol, chloride of aluminum, saltpeter, salicylic acid, and glycerine in alcohol and water.

The composition is prepared by first dissolving three pounds of saltpeter in one gallon of boiling water, then dissolving four ounces of thymol, six ounces of chloride of aluminum, four ounces of salicylic acid, and four ounces of glycerine in one gallon of alcohol, and adding about three gallons of water, so as to obtain five gallons of the composition.

A clear chemical solution of powerful preservative and antiseptic properties is thus obtained that is applied to the dead body in the usual manner, so as to effectively prevent putrid decomposition, and preserve the body without the use of ice.

I am aware that meats have been preserved by thymol alone, or dissolved in water, alcohol, or glycerine; also, that biborate of soda, acetate of soda, borate of soda, chloride of sodium, nitrate of potash, acetate of ammonia, crystallized thymic acid, acetate of alumina, and acetate of baryta have all been used to form a preservative solution for meat, and that salicylic acid has been employed as an antiseptic.

Having thus described my invention, I claim as new and desire to secure by Letters Patent—

An embalming-composition consisting of a solution of saltpeter, thymol, chloride of aluminum, salicylic acid, and glycerine in alcohol and water, substantially as and for the purpose set forth.

RICHARD J. McGOWAN.

Witnesses:
 PAUL GOEPEL,
 C. SEDGWICK.